Aug. 31, 1937.  F. L. CONE  2,091,700
SPINDLE BEARING LUBRICATION
Filed Oct. 12, 1935
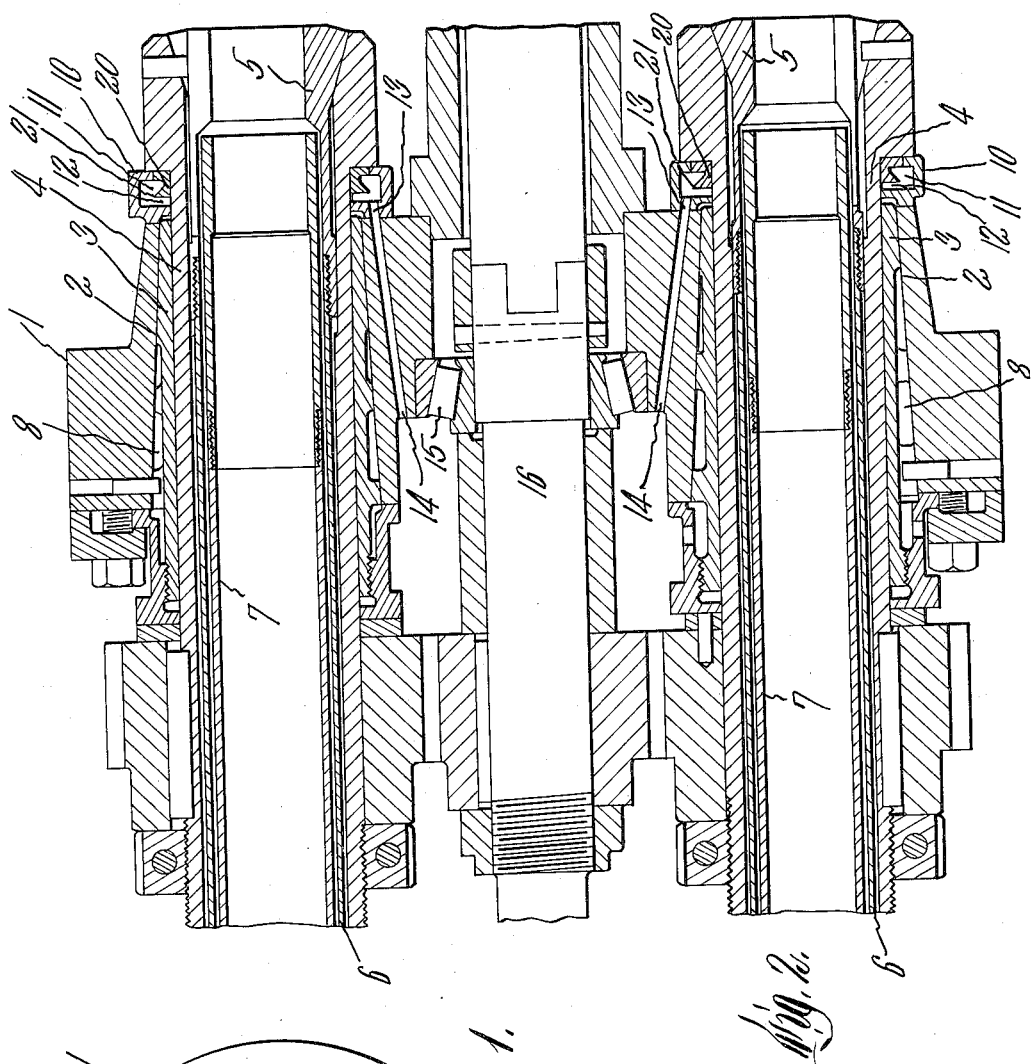
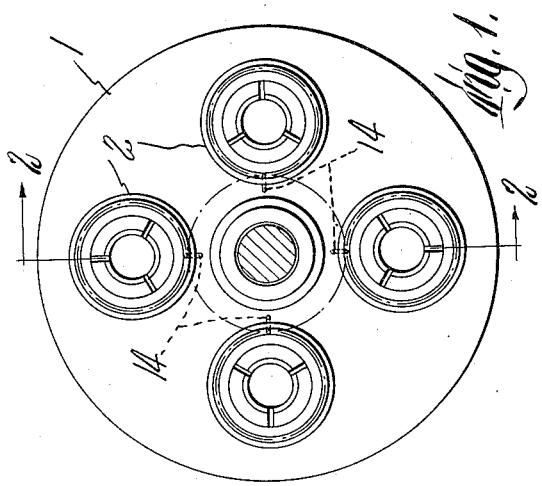
Inventor
Frank L. Cone Patented Aug. 31, 1937

2,091,700

UNITED STATES PATENT OFFICE 2,091,700

SPINDLE BEARING LUBRICATION

Frank L. Cone, Windsor, Vt.; Raymond H. Cone, Henry P. Chaplin, and Horace P. McClary, all of Windsor, Vt., executors of said Frank L. Cone, deceased Application October 12, 1935, Serial No. 44,673

4 Claims. (Cl. 29—37)

In spindle bearings such, for example, as those used for lathes or the like there is a tendency for lubricant to be thrown out by centrifugal force and escape. Where this occurs near to the work holder, it may mix with the coolant and cannot thereafter be recovered and used for lubricating purposes.

One object of the present invention is, therefore, to provide means for trapping such lubricant as it passes from the bearing and to prevent it from mixing with the coolant and to conduct it back where it can be used further. While it is not in its broadest aspects limited to such use, this invention has been developed with particular reference to lathes of the multiple spindle type and where the spindles are arranged in circular series about the axis of an indexing drum or turret.

For a more complete understanding of this invention, reference may be had to the accompanying drawing in which Figure 1 is a front end elevation of an indexing turret having a plurality of rotary work spindles for bar stock.

Figure 2 is a detail section to a larger scale on line 2—2 of Figure 1.

Referring to the drawing, at I is indicated the inner end wall member of an indexing turret, this wall member being shown as circular in outline so that it may be journaled in a suitable support in the well known manner. This wall member is provided with a plurality of bearing openings as at 2, which are shown as tapered and in which are rotatably mounted the mating tapered bearing sleeves 3 which are adjustably secured axially to the outer faces of the spindles 4.

As shown these spindles are hollow for the reception of bar stock which may extend therethrough and be clamped in position as by means of suitable stock-clamping devices such as the collet 5 which is slidable axially within the spindle 4 and is secured to an actuating sleeve 6. Inwardly of this sleeve 6 is shown positioned a stock feeder sleeve 7 which may be of any suitable or usual construction. The sleeve 2 is shown as provided with lubricant-receiving channels 8 into which lubricant may be supplied by any suitable means, as, for example, the means shown in Figure 1 of my Patent No. 1,224,714, granted May 1, 1917. The means for introducing the lubricant is not shown in the drawing of this application, for the sake of simplicity, and any suitable means may be employed as desired.

Arranged on the outer face of the end wall member I and surrounding each of the spindles 4, in accordance with this invention, is an annular member 10 having an annular chamber 11 therein surrounding its respective spindle and open on its inner face as at 12 in an annular slot to communicate with the outer face of the spindle 5 so as to receive lubricant escaping from the sleeve 3 and the journal bearing opening 2. These annular members 10 are secured to the turret, and as the spindle journaled therein rotates, the lubricant escaping from the bearing opening enters into the chamber from its inner end, being thrown off by centrifugal force from the outer face of the spindle which is rotating. This member 10 thus acts as a trap to receive the oil which otherwise would escape from the bearing openings adjacent to the work holder of each spindle where it would come in contact with the coolant and thus be so contaminated that it could not longer be used for lubricating purposes. Each of these members 10 is provided with one or more passages, such as 13, which register with passages 14 extending through the end wall I and so inclined relative to the indexing axis of the turret that in one or more indexed positions of the turret, each passage 14 is inclined downwardly and rearwardly so that the oil collected in the corresponding chamber 11 is caused to drain out from this chamber and back into the turret out of reach of the coolant, which may contact with the outer face of the turret wall member I. Thus, during the entire cycle of operation of the machine, each of the spindles at some time assumes such an indexed position that its chamber 11 is drained of the lubricating oil. In connection with the four spindle machine shown, when a spindle is in its uppermost position, the oil drains down within the turret above the bearings 15 for the spindle drive shaft 16.

As shown in my Patent No. 1,224,714, hereinbefore mentioned, lubricating oil which finds its way down back of the forward end wall of the turret, collects in an oil reservoir beneath the turret from which it is returned by suitable pumps to the spindle bearings for reuse without the possibility of becoming mixed with or contaminated by the coolant which is flowed on to the work while it is being operated upon by the lathe tools.

It will be noted that inwardly of each of the members 10 is an annular wall portion 20 rotatable with the spindle and forming one wall of the slot or opening 12 through which the oil is thrown into the chamber 11. There is an outwardly extended annular ridge 21 on the back or inner edge of this wall member 20 adjacent to the slot 12, acting as a baffle to prevent back flow of such oil into contact with the spindle. This, with the member 10, provides an annular passage out of contact with the spindle and in which the oil is guided to the lower portion of the chamber 11 in any indexed position of the turret from which this oil may drain back at suitable times through the registering passages 13 and 14 into the turret as hereinbefore explained.

From the foregoing description of an embodiment of this invention, it should be evident to those skilled in the art that various changes and modifications might be made without departing from the spirit or scope of this invention as defined by the appended claims.

I claim:

1. In combination with a rotary spindle, a wall member having an opening in which said spindle is journaled, a member through which said spindle passes at one end of said journal opening, said member having an annular channel surrounding said spindle, said channel communicating through an annular slot with the outer face of said spindle, a member having an outwardly projecting annular baffle adjacent to said slot, and means for conducting lubricant from said channel, said member being secured against rotation with said spindle.

2. In combination, an indexing turret having an upright end wall member, a plurality of rotary spindles journaled in said turret and arranged in circular series about the indexing axis of said turret, said wall member having a journal opening for each of said spindles, an annular member surrounding each spindle on the outer face of said wall member and having an annular chamber open on its inner face to receive lubricant escaping from said opening, each of said annular members and said wall member having registering passages inclined relative to said axis, said wall member passages extending through said wall member, whereby in at least one indexed angular position of said turret for each spindle, lubricant may drain from its respective chamber into said turret.

3. In combination, an indexing turret having an upright end wall member, a plurality of rotary spindles journaled in said turret and arranged in circular series about the indexing axis of said turret, rotary driving mechanism for said spindles within said turret, said wall member having a journal opening for each of said spindles, an annular member surrounding each spindle on the outer face of said wall member and having an annular chamber open on its inner face to receive lubricant escaping from said opening, each of said annular members and said wall member having registering passages inclined relative to said axis, said wall member passages extending through said wall member, whereby in at least one indexed angular position of said turret for each spindle, lubricant may drain from its respective chamber into said turret to said driving mechanism.

4. In combination, an indexing turret having an upright end wall member, a plurality of rotary spindles journaled in said turret and arranged in circular series about the indexing axis of said turret, rotary driving mechanism for said spindles within said turret, said wall member having a journal opening for each of said spindles, an annular member surrounding each spindle on the outer face of said wall member and having an annular chamber communicating through an annular slot with the outer face of said spindle and having an outwardly projecting annular baffle adjacent to said slot providing an annular chamber out of contact with said spindle, each of said annular members and said wall member having registering passages inclined relative to said axis, said wall member passages extending through said wall member, whereby in at least one indexed angular position of said turret for each spindle, lubricant may drain from its respective chamber into said turret to said driving mechanism.

FRANK L. CONE.